United States Patent
Lind et al.

(10) Patent No.: US 11,917,087 B2
(45) Date of Patent: Feb. 27, 2024

(54) TRANSPARENT SHORT-RANGE WIRELESS DEVICE FACTOR IN A MULTI-FACTOR AUTHENTICATION SYSTEM

(71) Applicant: Okta, Inc., San Francisco, CA (US)

(72) Inventors: Stephen Woodward Lind, El Cerrito, CA (US); Bidan Sinha, Milpitas, CA (US); Karthik Bhat, Saratoga, CA (US); Naveen Kumar Keerthy, San Jose, CA (US); Jintai He, San Mateo, CA (US); Kavitha Chandramohan, Maple (CA)

( * ) Notice: Subject to any disclaimer, the term of this patent is extended or adjusted under 35 U.S.C. 154(b) by 214 days.

(21) Appl. No.: 17/589,719

(22) Filed: Jan. 31, 2022

(65) Prior Publication Data

US 2023/0246851 A1    Aug. 3, 2023

(51) Int. Cl.
| | |
|---|---|
| *H04L 9/32* | (2006.01) |
| *H04W 12/0431* | (2021.01) |
| *H04W 12/069* | (2021.01) |
| *H04W 12/63* | (2021.01) |
| *H04W 4/80* | (2018.01) |

(52) U.S. Cl.
CPC ....... *H04L 9/3273* (2013.01); *H04W 12/0431* (2021.01); *H04W 12/069* (2021.01); *H04W 12/63* (2021.01); *H04W 4/80* (2018.02)

(58) Field of Classification Search
CPC ............. H04L 9/3273; H04L 9/3215; H04L 9/3226; H04L 9/3263; H04L 2209/805; H04L 9/3247; H04L 9/3271; H04W 12/0431; H04W 12/069; H04W 12/63; H04W 4/80; H04W 12/06
See application file for complete search history.

(56) References Cited

PUBLICATIONS

Kensington, "VeriMark™ Fingerprint Key - FIDO U2F for Universal 2nd Factor Authentication & Windows Hello™ SKU: K67977WW," Date Unknown, five pages, [Online] [Retrieved on Oct. 20, 2022] Retrieved from the Internet <URL: https://www.kensington.com/p/products/data-protection/biometric/verimark-fingerprint-key-fido-u2f-2nd-factor-authentication-and-windows-hello/>.

Saaspass, "Move Beyond Passwords with The Only Full-Stack Identity & Access Management Solution," 2021, 23 pages, [Online] ] [Retrieved on Oct. 20, 2022] Retrieved from the Internet <URL: https://saaspass.com/>.

Symantec, "Symantec VIP—Two Factor Authentication Anywhere," Date Unknown, six pages, [Online] [Retrieved on Oct. 20, 2022] Retrieved from the Internet <URL: https://vip.symantec.com/>.

Wikipedia, "FIDO Alliance," Jan. 21, 2021, four pages, [Online] [Retrieved on Oct. 20, 2022] Retrieved from the Internet <URL: https://en.wikipedia.org/w/index.php?title=FIDO_Alliance&oldid=1001844970>.

(Continued)

*Primary Examiner* — Izunna Okeke
(74) *Attorney, Agent, or Firm* — Holland & Hart LLP

(57) ABSTRACT

An authentication system supports multi-factor authentication (MFA) when authenticating the identity of a user. A challenge-response portion of the authentication process is delegated to an MFA device—a secondary device within control of the user, but separate from the primary login device that the user is using when initiating the authentication. Communications between the MFA device and the login device are conducted using a short-range wireless communication protocol (e.g., Bluetooth™ or NFC), so that the two devices must be in close physical proximity to each other.

15 Claims, 3 Drawing Sheets

(56) References Cited

PUBLICATIONS

Wikipedia, "Titan Security Key," Jun. 30, 2022, two pages, [Online] [Retrieved on Oct. 20, 2022] Retrieved from the Internet <URL: https://en.wikipedia.org/wiki/Titan_Security_Key>.

Wikipedia, "YubiKey," Jan. 14, 2021, eight pages, [Online] [Retrieved on Oct. 20, 2022] Retrieved from the Internet <URL: https://en.wikipedia.org/w/index.php?title=YubiKey&oldid=1000388024>.

TRANSPARENT SHORT-RANGE WIRELESS DEVICE FACTOR IN A MULTI-FACTOR AUTHENTICATION SYSTEM

FIELD OF ART

The present invention generally relates to the field of software systems, and more particularly, to incorporating a short-range wireless device as an automated factor provider in a multi-factor authentication system.

BACKGROUND

Authentication systems authenticate the purported identity of a user wishing to gain access to a given electronic system. Multi-Factor Authentication (MFA) systems enhance security by requiring users to provide multiple different types of credentials ("factors") before the MFA systems consider the user to be authenticated. For example, an MFA system could require—in addition to a standard credential such as a password—one or more of other types of credentials, such as biometric credentials (e.g., fingerprints), push notifications, one-time passwords received through other channels such as text messaging, or the like.

At the same time that an MFA system should be designed to be highly secure, however, the additional security should not unduly reduce the ease of use of the system. Certain types of credentials are more unwieldy for a user than others. Credential types involving hardware devices (such as smartphones) that are separate from the device that the user is using to access resources (e.g., a laptop) provide strong security by relying on physical possession of a unique piece of hardware (which may additionally be secured by its own credentials). However, typically, when a particular secondary credential involves such a separate device, the user must take express actions to provide secondary credentials for an MFA system via the separate device. For example, push notifications require a user to take out and unlock the user's smartphone device and use it to approve the authentication. Entering a one-time password similarly requires the user to take out and unlock the smartphone device, and additionally to enter the password. Such requirements for user input reduce the seamlessness of the authentication experience and potentially increase user frustration with the system, possibly to the point that the user forgoes the use of a second factor entirely, thereby greatly reducing system security.

SUMMARY

An authentication system supports multi-factor authentication (MFA) when authenticating the identity of a user. A challenge-response portion of the authentication process is delegated to an MFA device—a secondary device within control of the user, but separate from the primary login device that the user is using when initiating the authentication. Communications between the MFA device and the login device are conducted using a short-range wireless communication protocol (e.g., Bluetooth™ or NFC), so that the two devices must be in close physical proximity to each other.

The requirement of close physical proximity of the login device and MFA device enhances the security of the system, since an attacker would need to be very close to the user and likely within the user's view—to intercept communications between the two devices. The fact that information on the MFA device is communicated directly to the authentication system—rather than relayed through the login device—further enhances security by employing separate communication channels, thereby dramatically increasing the difficulty of attack. The MFA device 121B also participates in the authentication process in a transparent manner, so the user is freed from the need to provide input, which makes the authentication process seamless, as well as secure.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
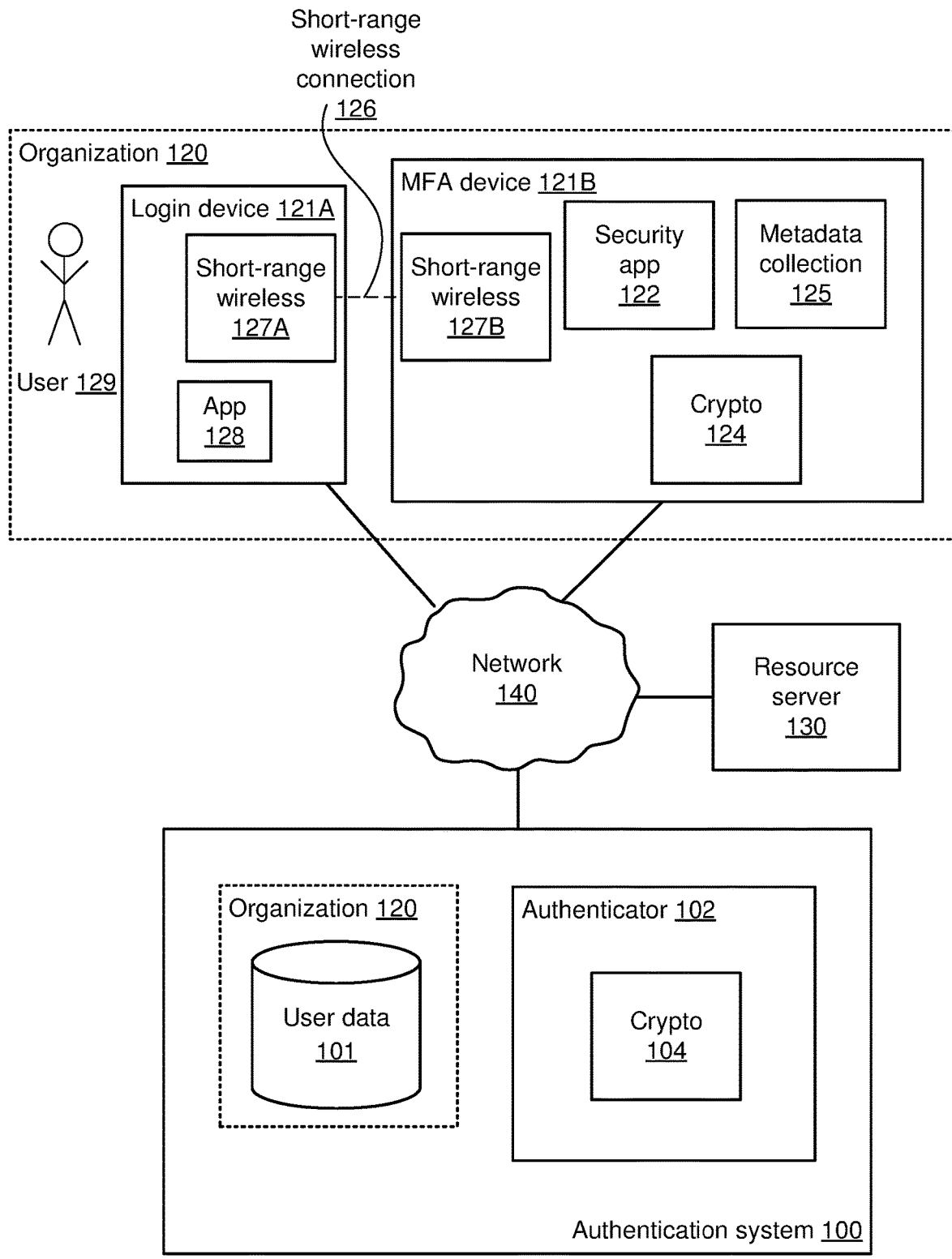
FIG. 1 illustrates one embodiment of a computing environment in which users use client computing devices to obtain access to authenticated resources over a network, according to some embodiments.

FIG. 1 illustrates one embodiment of a computing environment in which users use client computing devices to obtain access to authenticated resources over a network, according to some embodiments. The users are affiliated with an organization (e.g., employees or volunteers of the organization) and may access the resources on behalf of the organization. The users may have multiple accounts on different systems, and the resources that the users access may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.), databases, file systems, or the like. Such applications could be, for example, entirely web-based and accessible through a web browser, or could be accessible through a native application installed on the user's client device and communicating with a remote application server. Since each application or other resource could be from a different provider each of which could have a different identity for a user—a single user will typically have many different identities and associated credentials corresponding to the different resources that the user uses. However, for purposes of the invention, a user need only have a single account with a single corresponding identity.

An authentication system verifies the identities of users, ensuring that the user to be authenticated is indeed the specific user that the user is claiming to be (the "purported user"). If the user is successfully verified, the authentication system provides an authentication token that a resource server will accept as proof of the user's identity (e.g., via an OAuth flow) and hence of the user's permission to access requested resources. The authentication system offers multifactor authentication (MFA), such as one-time passwords (OTP), biometrics, or the like, in addition to a primary credential (e.g., a password). The entities of FIG. 1 are now described in more detail.

The organization 120 is an entity, such as a business, a school, a governmental agency, or the like, that has a number of affiliated users 129, such as employees or volunteers. One or more client devices 121 (such as login device 121A and MFA device 121B) are registered to the users 129 by the organization 120 (or, in some embodiments, inferred from observation of past successful login patterns), and the users use the client devices to access resources associated with the organization. Although for simplicity FIG. 1 illustrates only a single user 129, login device 121A, and MFA device 121B, there may be any number of either. Any given user 129 may have an MFA device 121B, which acts in conjunction with the login device 121A to provide additional security via automated short-range wireless MFA.

The resource server 130 provides access a resource, such as a web-based application (e.g., MICROSOFT OFFICE 365™), a service, a database, a document, or the like. The resource server 130 may be on a server separate from the systems of the authentication system 100 or the organization 120, or it may be part of any of the other systems. The resource server 130 requires authentication of users before the users may gain access to some or all of its resources, and (in embodiments in which the resource server 130 is independent of the authentication system 100) the resource server 130 accepts tokens of authentication from the authentication system 100 as establishing user identity.

The authentication system 100 authenticates the identity of the user 129, granting the user some proof of authentication, such as an authentication token, upon successful verification. The authentication system 100 stores user data 101 that include a set of identities of known users with accounts on the authentication system 100. (In FIG. 1, the block for "organization 120" within the authentication system 100 symbolizes that the organization 120 has a set of data on the authentication system that is dedicated to the organization, such as the user data 101 corresponding to that organization.) The user data 101 may include a form of identity on the authentication system 100 such as a username, as well as other credential data associated with a user, such as a user password and/or information derived therefrom (such as an encrypted form of the password). The user data 101 may also include many other types of data about users, such as the credential types and providers that the users may use when seeking identity verification from the authentication system 100, their role(s) or group(s) within the organization 120 to which they belong (e.g., "Engineering", "Legal", "Manager 2", "Director", or the like), and/or the resources to which they have access (e.g., third-party applications such as SALESFORCE, MICROSOFT OFFICE 365, SLACK, or the like), as some examples. The user data 101 may also include identities and credentials of the various users on the various accounts to which they have access, thereby linking a user's identity on the authentication system 100 to the user's identities on those different accounts and (by extension) permitting access to those accounts. In some embodiments, the authentication system 100 is part of the organization 120, rather than being an independent entity as it is in other embodiments. In some embodiments, the authentication system 100 is a multi-tenant system, supporting multiple organizations 120 that serve as tenants of the system. In such embodiments, there is one instance of each of the organization-specific components (e.g., the user data 101) for each tenant organization.

In some embodiments, software on the client device(s) 121 facilitates user authentication by securely and transparently communicating with the authentication system 100 that primarily handles the authentication, and by providing any resulting authentication tokens to a resource server 130 whose resources the user is attempting to access. In this way, the users of the organization 120 simply and securely obtain access to the resources that they need. Such software on the client device(s) 121 may (although need not) be provided by the entity responsible for the authentication system 100. In some embodiments, the software is an authenticator application, a locally-installed application. In such embodiments, the authenticator application may have a graphical user interface that the user 129 uses to specify data used to authenticate the user to the authentication system 100. For instance, the authenticator application could display text fields or other data entry areas for specifying a username and password of the user 129, a drop-down list or other menu of types of MFA factors to use for authentication (e.g., biometrics such as voice verification, physical tokens, push notifications, or OTP), or the like. Based on the data and/or selections specified by the user 129 in the user interface, the authenticator application communicates with the authentication system 100 to authenticate the user on the authentication system 100. In other embodiments, the authenticator application is implemented as a plugin for another application. In embodiments described below, in which the MFA device 121B is used to provide transparent authentication, there is no need for a user interface for user input for some or all of the authentication process.

Physically, the organization 120 is made up of a number of computing systems, including the various client devices 121; one or more internal networks that connects the computing systems, including routers or other networking devices that define the boundary between the organization and external networks; and the like.

Similarly, the authentication system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

In some embodiments, the authentication system 100 includes single sign-on (SSO) functionality that—once the user has been authenticated—allows the authentication system to transparently log a user in to the different accounts or other resources to which the user has access. For example, for a given user who has logged in to the authentication system 100, the authentication system can look up the user's accounts or other resources within the user data 101, as well as the user's credentials for those accounts. Using the credentials, as well as metadata or other information about the accounts, authentication system 100 can automatically log the user into the applications or other resources described in the user data 101, such as by establishing application sessions with the various applications and providing corresponding session data (e.g., session tokens) to the device 121. Thus, with a single login to the authentication system 100, the SSO functionality of the authentication system provides a user with automatic access to all the user's accounts or other resources.

The authentication system 100 has an authenticator module 102 that (in concert with other modules on other systems) handles the details of authenticating that a particular authentication request does indeed originate from or on behalf of the purported user. In some embodiments, the authenticator module 102 supports multi-factor authentication (MFA), requiring that users using MFA provide not only a primary credential type (e.g., password), but also one or more secondary credential types. When a particular user requests authentication of the user's identity, the authenticator module 102 looks up the user in the user data 101 according to the user's purported identity (e.g., username), noting the credential types that the user is eligible to use for MFA. For example, if the purported user has previously been enrolled to use challenges conveyed over short-range wireless as a credential type (and an administrator has not disallowed its use), the authenticator module allows this to be used as a verification option for the user during authentication.

The login device 121A, MFA device 121B, and authenticator 102 have a number of components that interoperate to provide authentication using short-range wireless communication. These components are now described.

The login device 121A and the MFA device 121B both have a short-range wireless component, which includes the hardware and software (firmware, drivers, etc.) needed to communicate using a particular type of short-range wireless. As some non-exhaustive examples, in some embodiments the short-range wireless uses Bluetooth™, and in other embodiments, the short-range wireless uses near-field communication (NFC). In some embodiments, the short-range wireless component has a maximum range of no more than 100 meters. The fact that the type of wireless technology being used has a short range enhances the security of the system, since it restricts the MFA device 121B from being used beyond a short distance from the login device 121A, since it must remain within the signal range of that wireless type. This tight proximity requirement makes it dramatically more difficult for an attacker to gain access to or tamper with the communications, since the attacker would need to be physically nearby to—and likely visible to—the true user. Since virtually all (e.g., more than 99%) of security attacks are performed from locations far away from the user in question, the tight proximity requirement eliminates virtually all such attacks.

The login device 121A has an application 128 with a user interface that the user 129 uses to interact—directly or indirectly—with the authentication system 100. For example, the application 128 can be a web browser in which the authentication system 100 provides an HTML and JavaScript-based user interface for the user to access the user's various applications managed through the authentication system. Alternatively, the application 128 can be a native application specially designed to interact with the authentication system 100. Similarly, the MFA device 121B may have a security application 122 that manages interactions with the login device 121A and with the authentication system 100 when performing authentication operations, such as the operations illustrated in FIG. 2, discussed below.

The MFA device 121B and authenticator 102 additionally have cryptographic modules 124, 104 that perform the asymmetric key cryptographic operations that are used during authentication, such as encryption, decryption, signing, and signature verification.

The MFA device 121B additionally includes a metadata collection module 125 that obtains metadata to be provided to the authentication system 100 to further increase the level of security during authentication. The collected metadata describes characteristics of the MFA device 121B and/or the user 129 (for example), and analysis of this metadata allows the authentication system 100 to further verify that the user 129 requesting authentication is indeed the purported user. More details on the collected metadata are provided below in connection with step 250 of FIG. 2.

Figure 2:
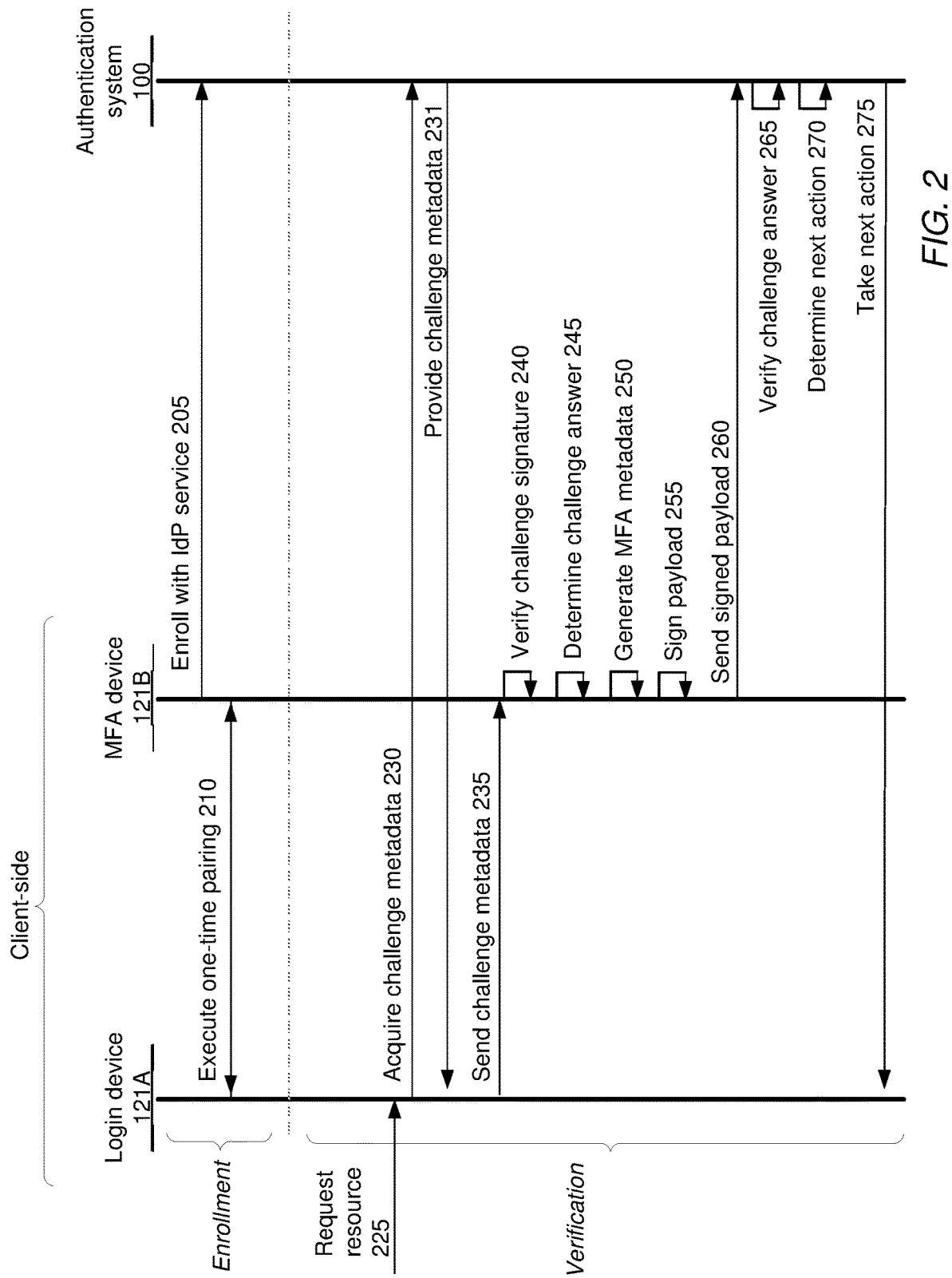
FIG. 2 illustrates the interactions that take place between the various entities of FIG. 1 during initial enrollment and later runtime authentication, according to some embodiments.

FIG. 2 illustrates the interactions that take place between the various entities of FIG. 1 during initial enrollment and later runtime authentication, according to some embodiments. In order to be part of authentication, the MFA device 121B of a user is first enrolled with the authentication system 100. After enrollment, the MFA device 121B operates together with the user's login device 121A to semi-transparently or fully-transparently authenticate the user with the authentication system 100. These phases are now described in additional detail.

Enrollment Phase

The MFA device 121B is first enrolled 205 with the authentication system 100. For example, the user of the MFA device 121B may use a graphical user interface of security application 122 to begin the enrollment process. As part of enrollment 205, the MFA device 121B (e.g., using its cryptographic module 124 and security application 122) generates a <public, private> keypair from a secure asymmetric key cryptosystem, such as a discrete log or elliptic curve cryptosystem. The MFA device 121B securely stores the private key and registers the public key with the authentication system 100 to enable future secure communications, including the ability to verify cryptographic signatures. The registration may also include other identifying information associated with the MFA device 121B that the authentication system 100 can later use to verify the MFA device, such as a unique identifier for the device itself, operating system version/subversion of the MFA device, an identifier (e.g., a username) used to uniquely identify the user 129 to the authentication system 100, and/or the like. This information may be saved in the user data 101 in association with the user 129.

The MFA device 121B may optionally also pair 210 with the login device 121A in order to gain the ability to establish secure (encrypted) communication channels when communicating with the login device 121A using the short-range wireless connection 126. The pairing 210 need only be done once. Future secure communications may exchange different types of information—such as a shared secret, personal identification number (PIN), or asymmetric keys, in different embodiments—to establish a secure (encrypted) communication channel over the short-range wireless connection 126.

Authentication Phase

The authentication flow of FIG. 2 begins when there is a request 225 via the login device 121A for a resource of the resource server 130 or of another system that requires authentication by the authentication system 100 before permitting access. For example, the user 129 might generate the request 225 by clicking on a link or icon for an application within a dashboard user interface provided by the application 128 and showing all of the user's applications managed by the authentication system. This causes the browser (or other application presenting the user interface to the user) to send a message leading to acquiring 230 challenge metadata. The message may be an express request for authentication (if the application 128 knows that the user 129 is not currently logged in to the authentication system 100), or a request for the resource desired by the user (in which case the authentication system 100 is the one to determine that the user is not logged in to the authentication system).

In any case, the authentication system 100 accordingly obtains and provides 231 the challenge metadata. The challenge metadata is a mechanism for the authentication system 100 to prove its authenticity to a user's device using a public key and signature, as well as a nonce value for the user's device to sign using its own private MFA key (where the paired public key was previously registered with the authentication system during the enrollment phase), thereby establishing the user's identity to the authentication system via its possession of the private key from the enrollment phase.

Rather than the login device 121A handling the response to the challenge of the authentication system 100, the login device 121A instead delegates the response to the MFA device 121B by sending 235 the challenge metadata to the MFA device 121B over the short-range wireless connection 126. This delegation has the benefit of allowing the MFA device 121B to provide a transparent response, thereby sparing the user 129 the need to be involved in the response. It has the further benefit of increasing security by communicating with the authentication system 100 through a different channel than that through which the original communication 230 came, which makes it more difficult for attackers to tamper with the communications between the client devices 121 and the authentication system 100.

Upon receipt of the challenge metadata from the login device 121A, the MFA device 121B replies to the authentication system challenge, additionally providing further metadata to enhance security. More specifically, in some embodiments the MFA device 121B ensures the integrity of the challenge by verifying 240 the signature of the authentication system 100 on the challenge metadata, e.g., by using the known public key of the authentication system 100. The MFA device also determines 245 an answer to the challenge provided 231 by the authentication system 100. For example, if the challenge was a nonce value encrypted by the authentication system 100 using the public key of the MFA device 121B that was generated and provided during enrollment, then the MFA device decrypts the nonce value using its private key that had been generated during enrollment 205.

The MFA device 121B (e.g., via the metadata collection module 125) also generates 250 MFA metadata to be provided to the authentication system 100 to further increase the level of security. The MFA metadata includes characteristics of the MFA device 121B and/or the user 129, which the authentication system can use to further increase confidence in the authenticity of the resource request 225. For example, in some embodiments the MFA metadata includes proximity information indicating a physical distance of the MFA device 121B from the login device 121A. The distance is relevant because if the distance is sufficiently small (e.g., within a few feet) then presumably the same user is using both devices, whereas if the devices were far apart one of the two devices might be being operated by another user not in view of the true user, such as in the street outside a home. The distance may be computed based on, for example, the signal strength of the short-range wireless when received from the login device 121A by the MFA device 121B. The MFA metadata can include other values, such as a geolocation of the MFA device 121B, device ID of the MFA device, operating system version and subversion of the MFA device, and the like. This information can be matched against the metadata supplied in the enrollment of step 205. Beyond any proximity information included within the MFA metadata, the MFA metadata inherently establishes that the MFA device 121A shares a physical presence with the login device 121A, in that since the two devices are communicating 235 over the short-range wireless connection 126, they must be within at most the maximum range of the short-range wireless connection.

The MFA device 121B can also sign 255 the payload (which includes the challenge answer and the MFA metadata, and possibly other values, such as any additional values provided by the login device 121A in step 235, such as an identifier (e.g., username) of the user 129 on the authentication system) using its private key generated during enrollment 205.

The MFA device 121B sends 260 the resulting payload to the authentication system 100. The payload is sent directly to the authentication system 100, in that it is not relayed through the login device 121A (although of course it is still typically relayed through intermediary routers and other network devices before arriving at the authentication system 100). Upon receipt of the payload from the MFA device 121B, the authentication system 100 verifies 265 that the provided answer to its challenge is correct (e.g., that the answer matches the original nonce value). The authentication system 100 may also determine 270 a next action for the authentication process based on additional considerations such as the strength of the MFA metadata, a match of the MFA metadata data provided in the payload to metadata provided by the MFA device 121B in the enrollment step 205, security settings of the user 129, policies of an organization 120 of which the user 129 is a member, or the like. For example, a policy of the organization might specify that as long as the challenge is answered correctly and the operating system version in the MFA metadata matches that originally provided during enrollment 205, the user 129 should be immediately authenticated, in which case the next action could be to authenticate the user and provide a corresponding authentication token. Alternatively, the policy might specify that in addition to the challenge being correctly answered, the user 129 must also provide the user's password as long as the proximity information indicates a distance over 5 feet between the login device 121A and the MFA device 121B, as just one example. In this example, if the distance were over 5 feet, then the next action would be to request a password from the user 129. The authentication system takes the determined next action 275, such as issuing an authentication token for access to a resource, updating a web page of the user to request a password, or the like.

The process of FIG. 2 takes place transparently, in that steps 230-275 are performed without manual input from the user, given that the MFA device 121B, in concert with the login device 121A and the authentication system 100, automatically performs the necessary actions. Thus, to accomplish this portion of the authentication, the user 129 need only have the MFA device 121B nearby, and need not enter any data into it or even unlock it. Of course, depending on the particular authentication policy, the user 129 may be required to perform additional manual steps (such as entering a password), but such steps are tangential to the authentication of steps 230-275.

As noted, if the pairing 210 is performed, then communications between the login device 121A and the MFA device 121B may be further secured (encrypted). In this way, even if an attacker manages to come within the range of the short-range wireless connection 126, the sending 235 of the challenge metadata can still be secured against tampering by the attacker due to the encryption of the connection.

Note that although the interactions of FIG. 2 were described as occurring in a particular order, variations are possible in different embodiments. As just one example, the actions 240, 245, and 250 are independent of each other and hence could be done any order, or in parallel.

Figure 3:
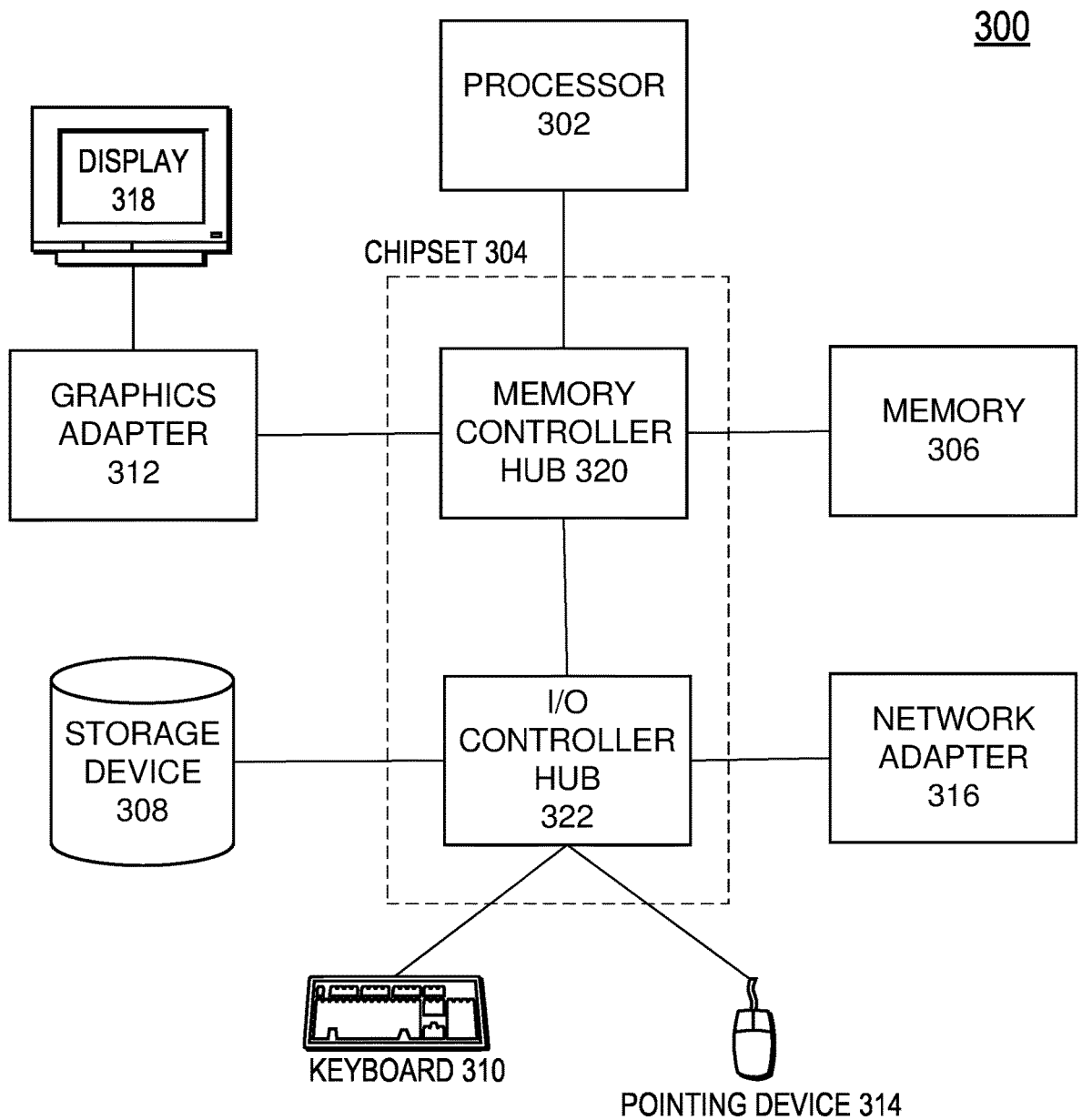
FIG. 3 is a high-level block diagram illustrating physical components of a computer used as part or all of (for example) the authentication system, the client devices, and/or the resource server of FIG. 1, according to one embodiment.

FIG. 3 is a high-level block diagram illustrating physical components of a computer 300 used as part or all of (for example) the authentication system 100, the client devices 121, and/or the resource server 130 of FIG. 1, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard 310 or pointing device 314. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies.

Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method, comprising:
   an enrollment phase comprising:
      enrolling with an authentication system, the enrolling comprising:
         generating a keypair consisting of a public key and private key;
         providing, to the authentication system:
            the public key; and
            metadata comprising at least one of:
               an operating system ID of a multi-factor authentication (MFA) device; or
               network information of the MFA device; and
         pairing with a login device to establish data for an encrypted communication channel between the MFA device and the login device over Bluetooth or near-field communication (NFC); and
   an authentication phase comprising:
      receiving signed authentication challenge metadata sent to the login device by the authentication system in response to a request by the login device to access a resource for which authentication is required;
      verifying a signature of the authentication system on the signed authentication challenge metadata;
      determining an answer to a challenge of the signed authentication challenge metadata;
      generating MFA metadata, the MFA metadata comprising an indicator of a distance of the MFA device from the login device;
      signing, with the private key, a payload comprising the answer and the MFA metadata; and
      sending the signed payload directly to the authentication system, wherein the authentication system authenticates the login device responsive to verifying at least one of:
         the answer, or
         the MFA metadata using the metadata provided to the authentication system during the enrollment phase;
   wherein operations of the authentication phase are performed by the MFA device without manual input from a user.

2. The method of claim 1, wherein the MFA metadata indicates that the MFA device shares a physical presence with the login device.

3. The method of claim 1, wherein the encrypted communication channel comprises a short-range wireless connection between the login device and the MFA device.

4. The method of claim 1, wherein the encrypted communication channel comprises a short-range wireless connection between the login device and the MFA device.

5. The method of claim 1, wherein determining the answer to the challenge of the signed authentication challenge metadata comprises decrypting a nonce value using the private key corresponding to the public key of the MFA device.

6. The method of claim 1, wherein the distance between the MFA device and the login device is determined based on a signal strength of the encrypted communication channel.

7. The method of claim 1, wherein the request to access the resource is received on behalf of the user of the login device.

8. A multi-factor authentication (MFA) device, comprising at least one memory that stores code and one or more processors coupled with the at least one memory, wherein the one or more processors are operable to execute the code to cause the MFA device to perform a secure, automated MFA login process that includes:
   an enrollment phase comprising:
      enrolling with an authentication system, the enrolling comprising:
         generating a keypair consisting of a public key and private key;
         providing, to the authentication system:
            the public key; and
            metadata comprising at least one of:
               an operating system ID of the MFA device; or
               network information of the MFA device; and
         pairing with a login device to establish data for an encrypted communication channel between the MFA device and the login device over Bluetooth or near-field communication (NFC); and
   an authentication phase comprising:
      receiving signed authentication challenge metadata sent to the login device by the authentication system in response to a request by the login device to access a resource for which authentication is required;
      verifying a signature of the authentication system on the signed authentication challenge metadata;
      determining an answer to a challenge of the signed authentication challenge metadata;
      generating MFA metadata, the MFA metadata comprising an indicator of a distance of the MFA device from the login device;
      signing, with the private key, a payload comprising the answer and the MFA metadata; and
      sending the signed payload directly to the authentication system, wherein the authentication system authenticates the login device responsive to verifying at least one of:
         the answer, or
         the MFA metadata using the metadata provided to the authentication system during the enrollment phase;
   wherein operations of the authentication phase are performed by the MFA device without manual input from a user.

9. The MFA device of claim 8, wherein the MFA metadata indicates that the MFA device shares a physical presence with the login device.

10. The MFA device of claim 8, wherein the encrypted communication channel comprises a short-range wireless connection between the login device and the MFA device.

11. The MFA device of claim 8, wherein the encrypted communication channel comprises a short-range wireless connection between the login device and the MFA device.

12. The MFA device of claim 8, wherein determining the answer to the challenge of the signed authentication challenge metadata comprises decrypting a nonce value using the private key corresponding to the public key of the MFA device.

13. The MFA device of claim 8, wherein the distance between the MFA device and the login device is determined based on a signal strength of the encrypted communication channel.

14. The MFA device of claim 8, wherein the request to access the resource is received on behalf of the user of the login device.

15. A non-transitory computer-readable medium storing code that comprises instructions executable by at least one processor of a multi-factor authentication (MFA) device to perform a secure, automated MFA login process that includes:
   an enrollment phase comprising:
      enrolling with an authentication system, the enrolling comprising:
         generating a keypair consisting of a public key and private key;
         providing, to the authentication system:
            the public key; and
            metadata comprising at least one of:
               an operating system ID of the MFA device; or
               network information of the MFA device; and
      pairing with a login device to establish data for an encrypted communication channel between the MFA device and the login device over Bluetooth or near-field communication (NFC); and
   an authentication phase comprising:
      receiving signed authentication challenge metadata sent to the login device by the authentication system in response to a request by the login device to access a resource for which authentication is required;
      verifying a signature of the authentication system on the signed authentication challenge metadata;
      determining an answer to a challenge of the signed authentication challenge metadata;
      generating MFA metadata, the MFA metadata comprising an indicator of a distance of the MFA device from the login device;
      signing, with the private key, a payload comprising the answer and the MFA metadata; and
      sending the signed payload directly to the authentication system, wherein the authentication system authenticates the login device responsive to verifying at least one of:
         the answer, or
         the MFA metadata using the metadata provided to the authentication system during the enrollment phase;
      wherein operations of the authentication phase are performed by the MFA device without manual input from a user.

* * * * *